Oct. 4, 1932.　　　　A. H. SMITH ET AL　　　　1,881,142
SEALING COMPOUND FOR CANS AND OTHER CONTAINERS
Filed July 19, 1928
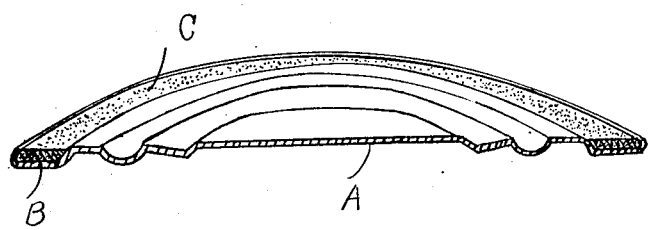
INVENTORS
BY
ATTORNEY Patented Oct. 4, 1932

1,881,142

UNITED STATES PATENT OFFICE

ARNOLD H. SMITH, OF AKRON, AND CLAUDE L. SHREINER, OF BARBERTON, OHIO, ASSIGNORS TO THE RUBBER SERVICE LABORATORIES CO., OF AKRON, OHIO, A CORPORATION OF OHIO

SEALING COMPOUND FOR CANS AND OTHER CONTAINERS

Application filed July 19, 1928. Serial No. 293,859.

The present invention relates to a method of preparing a seal for cans or other containers.

One object of the invention is to prepare a rubber sealing compound without the use of latex by a new process comprising the heating of rubber with a vulcanizing agent and a vulcanization accelerator. Another object of the invention is to produce a rubber sealing compound having the proper ratio of solids incorporated therein. By the term "solids" is included rubber itself. Still another object of the present invention is to produce a semi-vulcanized gasket that is durable and will age properly on standing.

In the past it has been the custom for the can manufacturer to furnish the canner or packer with a can body having a bottom attached thereto, and with the top died or stamped out ready to be attached. Formerly it was customary to attach this end or lid by soldering it to the body of the can, after the desired materials had been placed therein. This was objectionable for several reasons. In the first place some of the solder would frequently come in contact with the contents of the can with subsequent contamination thereof. Also this was a tedious and expensive operation. "Double sealing" of the tops and bottoms of the body of the container in the presence of a seal was next tried. The double seaming is done automatically by rolling or spinning together the edge of the can cover and a small flange, which has been previously pressed out from the bottom of the can into a seam. The seal is produced by the compressive confinement between the surfaces of the container body and its end or cover of some flexible or pliable body.

Numerous materials, as for example rubber gaskets, paper gaskets or packings, latex cements and rubber cement, have been used as a sealing medium in the "double seaming" process. All of these materials have their objectionable qualities.

Thus, rubber gaskets are not only expensive, but are difficult to apply; they are, moreover, subject to deterioration in respect to elasticity and "life" by exposure to air, sunlight and heat. Paper gaskets require special machinery and are difficult to apply. Upon storage the paper may become warped through dampness, causing an imperfect closure; or the seal may be imperfect where there is insufficient moisture in the material packed to cause the necessary swelling of the paper to effect a tight joint. The use of rubber latex as a can sealing medium or an ingredient thereof has several disadvantages. One objection is its instability; i. e., the fact that it is apt to coagulate and putrefy. Furthermore, latex cannot be adequately compounded inasmuch as the rubber particles are liable to precipitate on compounding. Such can sealing compounds, being unvulcanized, do not age as well as a vulcanized gasket. Another objection to the use of latex can sealing compounds lies in the fact that unless the material placed in the groove of the can lid is thoroughly dried, the moisture present causes the formation of rust on and the rapid deterioration of the can lid.

The use of rubber cement solutions in the past has also been unsatisfactory as a can sealing medium. Thus, for example, a benzene rubber cement has notoriously bad aging qualities, and the use thereof due to the benzene vapors evolved therefrom is injurious to the health of the workmen. The chief difficulty, however, arising from the use of rubber cement solutions has been that a solution of proper working viscosity is practically limited to about one-half pound of rubber per gallon of solvent. Rubber sealing compounds or cements having a viscosity greater than that represented in the viscosity of a solution containing one-half pound of rubber per gallon of solvent, for example benzene, usually exhibit difficulties in manipulation when applied to can lids by the well known methods. It will be observed that the low rubber content of a solution containing one half pound of rubber per gallon of solvent materially restricts the amount of rubber that can be used for sealing the can end, or for any other purpose on evaporation of said solvent. The amount of solid material present as a residue, for example remaining as a sealing medium in the can groove, after the evaporation of the solvent, is limited to the amount of solid present in that quantity of solution employed.

According to the present invention, a new rubber compound is disclosed which has the proper amount of solids incorporated therein for use as a can sealing medium, particularly in "double seaming" processes, is durable and will age properly.

In the drawing hereto annexed which represents a peripherally channelled can head, partly in diametrical section, partly in perspective; A represents the disc can head, B its peripheral channel and C the sealing material deposited therein.

The invention herein described is characterized in its broader aspect by the use of a rubber sealing compound comprising rubber heat-treated in the presence of an agent for reducing its viscosity, for example, the reaction product of substantially three molecular proportions of an aliphatic aldehyde, for example, acetaldehyde, butylaldehyde, and the like, and substantially two molecular proportions of an aromatic amine, for example aniline, the toluidines and the like, to which compounding ingredients, fillers and the like and an ultra vulcanization accelerator, preferably the carbon disulfid derivatives of the reaction product of piperidine and formaldehyde, preferably dissolved in a mineral oil, are added.

By an ultra accelerator is meant such an accelerating compound that will cause the vulcanization of rubber to take place in a shorter time and at a lower temperature than is the case with the usual accelerators in use in the vulcanization of rubber.

The preferred method of preparing the new type of material comprises the following:

Substantially 100 parts of rubber, for example pale grizzly crepe, were broken down on a rubber mill in the regular way. As soon as the rubber was smooth and soft on the mill, approximately two parts of the reaction product of three molecular proportions of acetaldehyde and two molecular proportions of aniline were added and thoroughly mixed therein. The mixture so formed was then sheeted off from the mill in sheets about one inch thick and placed in a closed container, which was then placed in a heater. Here heating of the mixture was carried out for about eight to ten hours at the temperature given by approximately fifty pounds of steam pressure per square inch. It should be noted that during this heating period, the steam is not allowed to come in contact with the rubber mix.

The rubber treated as hereinbefore described was then mixed with other compounding ingredients and fillers as shown below.

Approximately 40 parts of the broken down rubber mixture prepared as described were placed on a revolving mill, and after the rubber was smooth and soft approximately 28 parts of glue (calculated on a dry basis) were added thereto and mixed or milled in the usual way. After the glue was thoroughly mixed into the rubber mix, the mill rolls were cooled and the rubber mixture called "glue master", sheeted off and allowed to cool. After laying for a period of time, such as for example over night, the "glue master" mixture is again placed on a mill, broken down and the fillers and the like added comprising substantially 2.5 parts zinc oxide, 2.5 parts red oxide and one part sulfur. If convenient or desirable, lithopone or other fillers or coloring matter may be substituted for the red oxide mentioned above.

Approximately 27 pounds of the above compounded stock were then made into a rubber cement in the usual manner by incorporating therewith substantially 20 gallons of a suitable solvent, for example gasoline. In this form the cement is shipped to the consumer. Shortly before using it an ultra accelerator is added thereto. Thus, to approximately each gallon of cement is added substantially one fluid ounce of a mixture prepared by suspending approximately 125 grams of the ultra accelerator, preferably the carbon disulfid derivative of the reaction product of piperidine and formaldehyde suspended or dissolved in sufficient solvent, for example gasoline, to yield 50 fluid ounces of solution. The final cement material thus prepared will flow sufficiently well and can be applied to the grooves in the can lids by the machines commonly employed for that purpose. It has also been found that the solid content, or in other words the amount of rubber compound in suspension, is large enough so that on evaporation of the solvent from the rubber sealing compound placed in the groove of the can lid a sufficient layer of compounded rubber remains thereon to act as a satisfactory gasket when the can lid is fastened to the body of the container by a process, as for example "double seaming".

On evaporation of the solvent from the preferred rubber sealing compound that is placed on the can lids, some semi or prevulcanization takes place, thus producing a durable product that ages well on storage. Further vulcanization may take place on standing. If the rubber composition has not been entirely vulcanized when the can lid is placed on the body of the can, complete vulcanization is effected during the cooking or sterilizing of the materials after the can lids have been placed thereon, as the rubber sealing compound prepared as described has been found to vulcanize in twenty minutes and not over-vulcanize in ninety minutes at the temperature given by 17 pounds of steam pressure per square inch. This is substantially the time and temperature required to cook or sterilize the materials placed in the cans or containers.

In the preparation of a rubber sealing compound as hereinbefore disclosed, one is not limited to the use of para or high grade rubber; reclaimed rubber may also be employed. Other equivalent materials and other proportions of the various compounding ingredients described may be used in place of those particularly set forth, as is apparent to those skilled in the art to which this invention pertains.

What is claimed is:

1. The process for the preparation of a rubber sealing compound comprising the heating of rubber in the presence of a small proportion of the reaction product of substantially three molecular proportions of an aliphatic aldehyde and substantially two molecular proportions of a primary aromatic amine, and adding vulcanization ingredients and a small proportion of an ultra vulcanization accelerator thereto.

2. The process for the preparation of a rubber sealing compound comprising the heating of rubber in the presence of a small proportion of the reaction product of substantially three molecular proportions of acetaldehyde and substantially two molecular proportions of aniline, and adding fillers, sulfur and a small proportion of an ultra vulcanization accelerator thereto.

3. The process for the preparation of a rubber sealing compound comprising the heating of rubber in the presence of a small proportion of the reaction product of substantially three molecular proportions of acetaldehyde and substantially two molecular proportions of aniline, adding fillers, sulfur and a small proportion of the carbon disulfid derivative of the reaction product of piperidine and formaldehyde thereto.

4. The process for the preparation of a rubber sealing compound comprising the heating of rubber in the presence of a small proportion of the reaction product of substantially three molecular proportions of acetaldehyde and substantially two molecular proportions of aniline, and adding glue, zinc oxide, red oxide, sulfur and a small proportion of the carbon disulfid derivative of the reaction product of piperidine and formaldehyde dissolved in a mineral oil.

5. As a new article of manufacture, a can sealing compound prepared by heating rubber in the presence of a small proportion of the reaction product of substantially three molecular proportions of an aliphatic aldehyde and substantially two molecular proportions of a primary aromatic amine and adding vulcanization ingredients and a small proportion of an ultra vulcanization accelerator.

6. As a new article of manufacture, a can sealing compound prepared by heating rubber in the presence of a small proportion of the reaction product of approximately three molecular proportons of acetaldhehyde and substantially two molecular proportions of aniline, adding fillers, sulfur and a small proportion of the carbon disulfid derivative of the reaction product of piperidine and formaldehyde.

7. As a new article of manufacture, a can sealing compound prepared by heating rubber in the presence of a small proportion of the reaction product of approximately three molecular proportions of acetaldehyde and approximately two molecular proportions of aniline, and adding glue, zinc oxide, red oxide, sulfur and a small proportion of the carbon disulfid derivative of the reaction product of piperidine and formaldehyde.

8. The process for the preparation of a rubber sealing compound comprising the heating of rubber in the presence of a small proportion of the reaction product of substantially three molecular proportions of acetaldehyde and substantially two molecular proportions of aniline, and adding fillers, sulfur and a small proportion of an ultra vulcanization accelerator thereto and heating.

In testimony whereof we hereunto affix our signatures.

ARNOLD H. SMITH.
CLAUDE L. SHREINER.